(No Model.) 3 Sheets—Sheet 1.

G. F. McCOMBS.
MACHINE FOR CUTTING CORD.

No. 533,312. Patented Jan. 29, 1895.

WITNESSES
Darwin S. Wolcott
F. E. Gaither

INVENTOR
George F. McCombs
by George H. Christy
Atty (No Model.)  3 Sheets—Sheet 2.

G. F. McCOMBS.
MACHINE FOR CUTTING CORD.

No. 533,312.  Patented Jan. 29, 1895.

WITNESSES
Darwin S. Wolcott
F. E. Gaither

INVENTOR
George F. McCombs
by George H. Christy
Atty

THE NORRIS PETERS CO., PHOTO-LITHO., WASHINGTON, D. C.

(No Model.) 3 Sheets—Sheet 3.

G. F. McCOMBS.
MACHINE FOR CUTTING CORD.

No. 533,312. Patented Jan. 29, 1895.

WITNESSES
Darwin L. Wolcott
F. E. Gaither

INVENTOR
George F. McCombs
by George H. Christy
Atty

UNITED STATES PATENT OFFICE.

GEORGE F. McCOMBS, OF ALLEGHENY, PENNSYLVANIA.

MACHINE FOR CUTTING CORD.

SPECIFICATION forming part of Letters Patent No. 533,312, dated January 29, 1895.

Application filed August 1, 1893. Serial No. 482,118. (No model.)

*To all whom it may concern:*

Be it known that I, GEORGE F. MCCOMBS, a citizen of the United States, residing at Allegheny, in the county of Allegheny and State of Pennsylvania, have invented or discovered certain new and useful Improvements in Machines for Cutting Cord, &c., of which improvements the following is a specification.

The invention described herein relates to certain improvements in cutting cord or other flexible material into predetermined lengths without any material waste thereof.

My improvements are especially applicable for use in connection with machines for sewing brooms, wherein the sewing cord is cut off to lengths proportional to the size of the broom to be sewed, before being put into the machine. This cutting of the cord into lengths has heretofore been done by hand, resulting in great waste, as the cutting could not be accurately done, nor could the lengths be proportioned to the varying sizes of brooms.

The object of the present invention is to provide for the accurate cutting of the cord in exact accordance with the lengths required for each size of broom manufactured.

The invention is hereinafter more fully described and claimed.

Figures 1, 2:
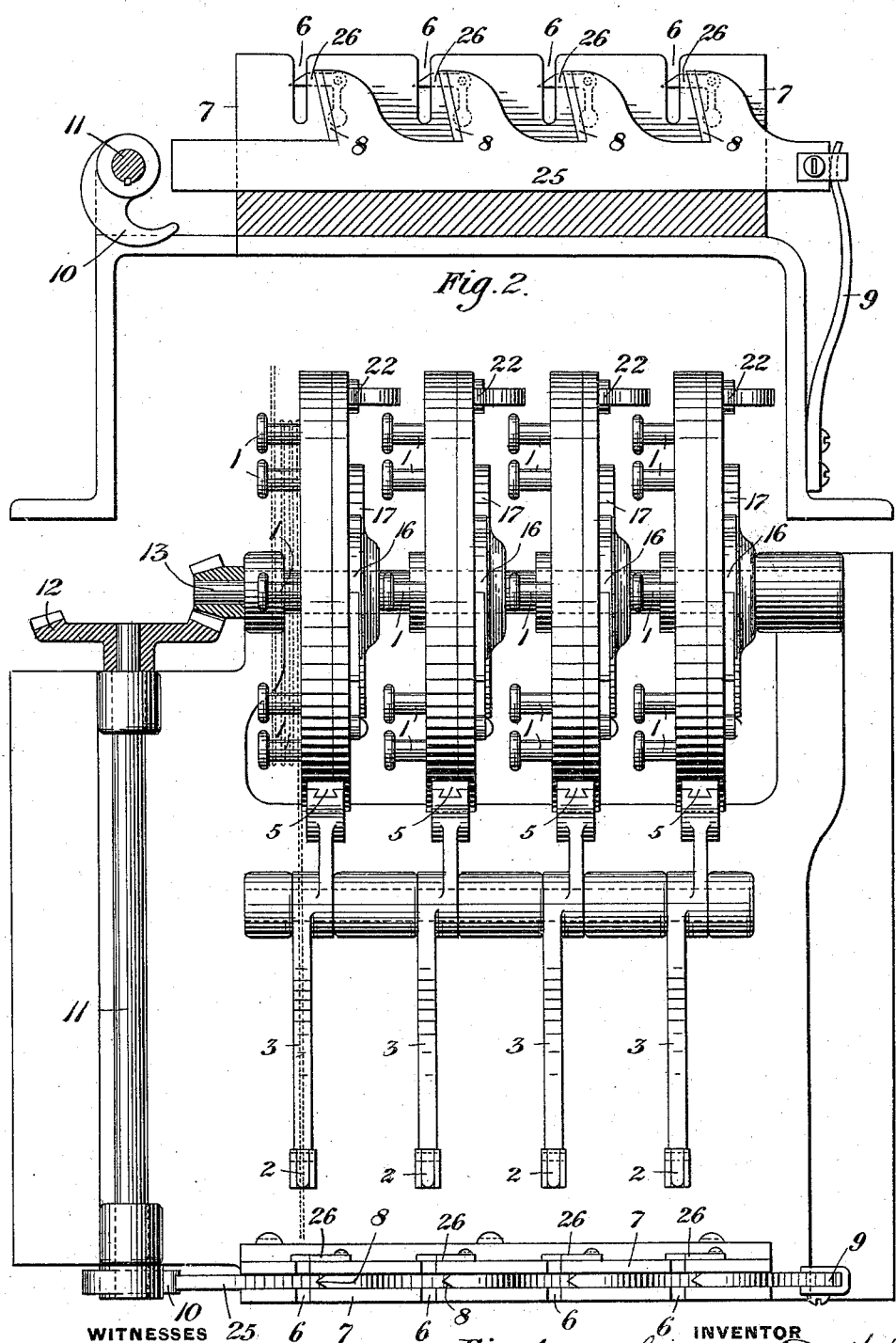
Figure 3:
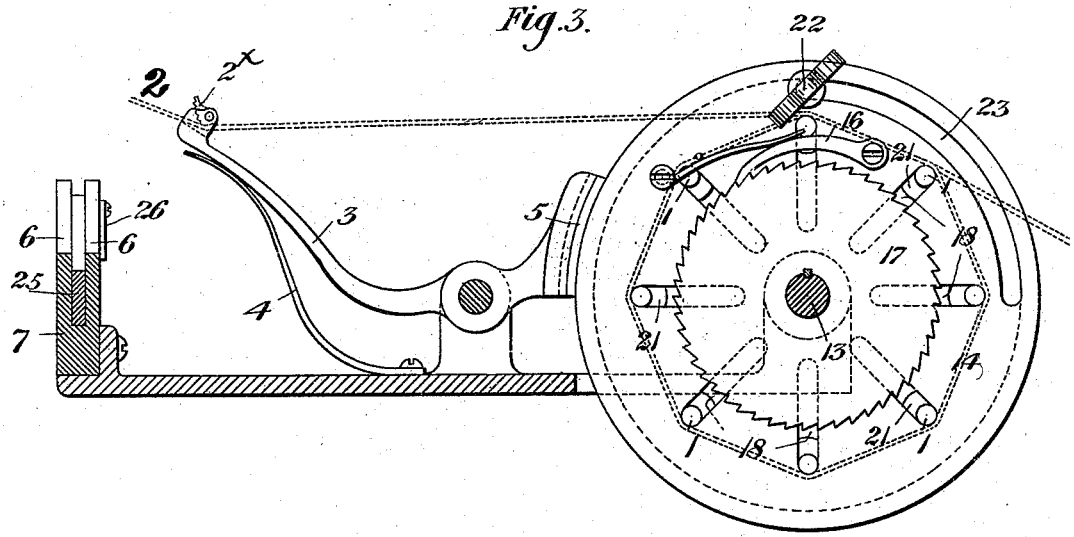
Figure 4:
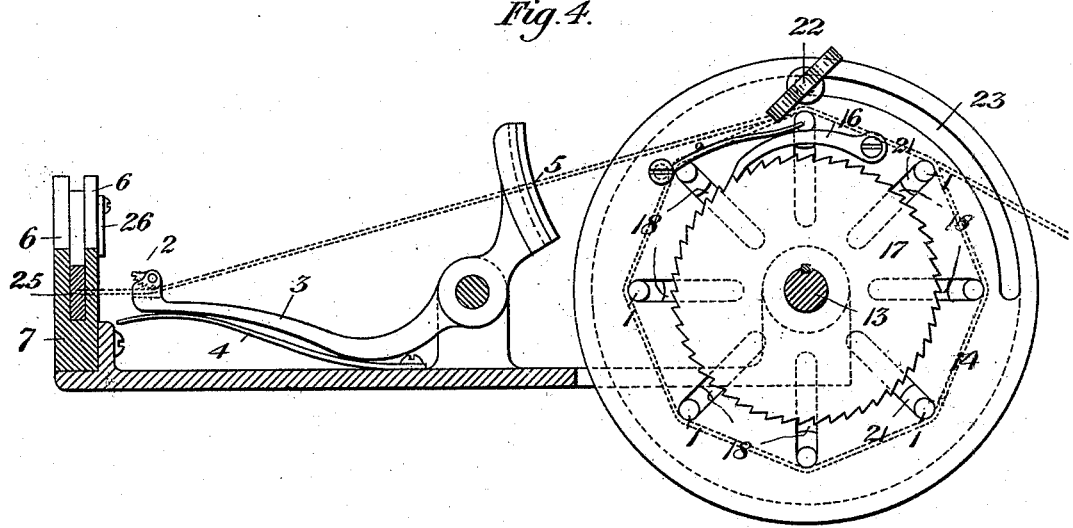
Figure 5:
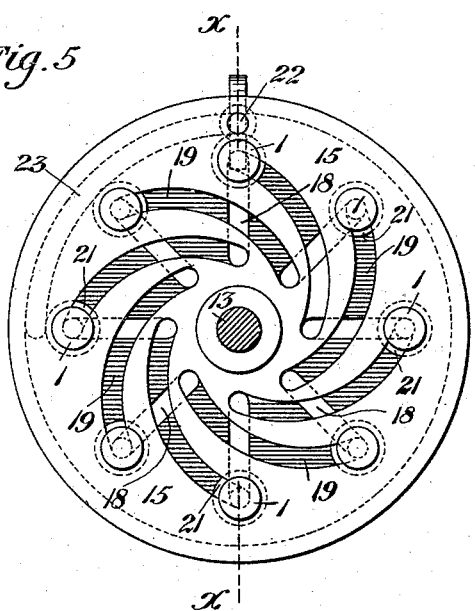
Figure 8:
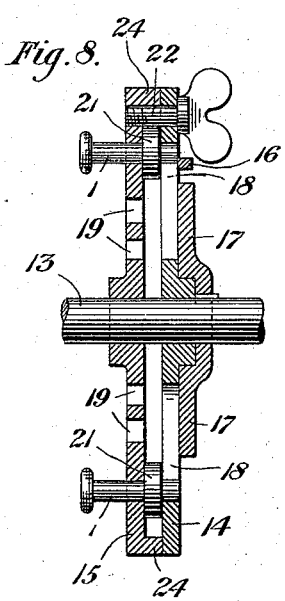
Figure 6:
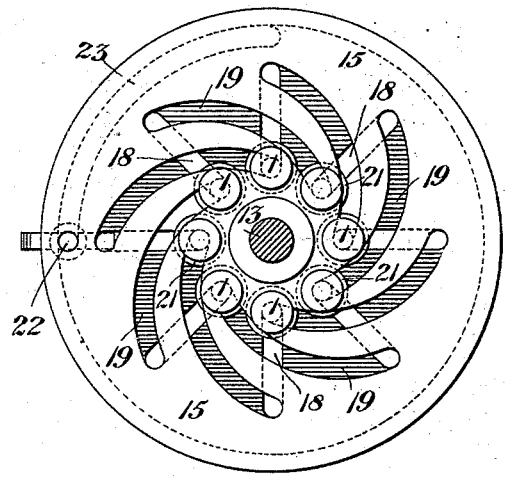
Figure 7:
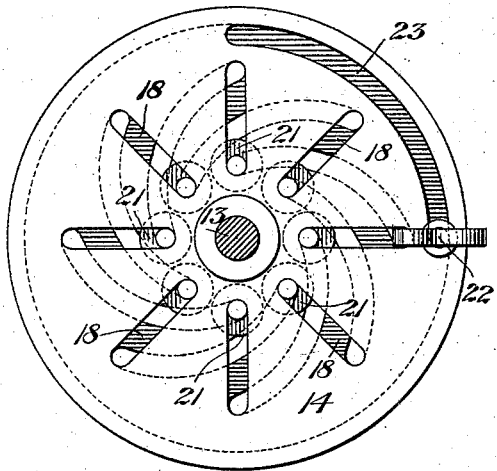

In the accompanying drawings forming a part of this specification, Figure 1 is a top plan view of my improved measuring and cutting mechanism. Fig. 2 is an end view partly in section and partly in elevation of the cutting mechanism. Figs. 3 and 4 are side elevations of the machine illustrating different positions of the stop mechanism. Figs. 5, 6 and 7 are views in side elevation of the measuring wheel, showing opposite sides of the wheel and different adjustments of the driving pins, and Fig. 8 is a sectional view, the plane of section being indicated by the line $x$, $x$, Fig. 5.

In the practice of my invention the cord or other material is drawn from a ball, spool or bobbin (not shown) and wound a sufficient number of turns, *e. g.* three, four or more, around the pins 1 to so bind upon the pins that when the cord is drawn out the wheel to which the pins are attached will be rotated and the cord will not slip on the pins. The cord is then passed under a cam $2^{\times}$ pivotally mounted between ears formed on the outer end of the lever 3. The cam is so mounted as to bear upon the cord and press it against the portion of the lever adjacent thereto. The cam $2^{\times}$ and the portion of the lever 3 adjacent thereto form a detent 2 for controlling and guiding the cord in its movements. The lever 3 is so pivoted that when free to be shifted by the spring 4, the shoe 5 on the inner end will be moved into engagement with the measuring wheel so as to check the rotation thereof, as shown in Figs. 1 and 3. The detent 2 is so constructed as to permit the free outward movement of the cord when pulled, but prevent any backward movement when the end of the cord is released.

In cutting off lengths of cord the operator catches the end of the cord projecting beyond the detent and pulls the cord along through the cutting mechanism arranged in convenient proximity to the detent end of the brake lever. The machine is so arranged that the operator in drawing out the cord naturally pulls down, thereby depressing the detent end of the brake lever against the tension of the spring 4 and shifting the brake shoe out of contact with the measuring wheel, as shown in Fig. 4, so that it can be rotated by the onward movement of the cord. As the cord is pulled out and down, as stated, it enters a slot 6 in the plates 7, forming one member of the cutting mechanism, the other member of the cutting mechanism being formed by the movable blade 8, arranged to reciprocate between the plates 7, as shown in Figs. 1, 2, 3 and 4.

The cutting blade is moved sharply in one direction to cut the cord by a spring 9, and in the opposite direction against the tension of the spring by a cam 10 on the shaft 11. The opposite end of this shaft 11 is provided with a beveled pinion 12 which intermeshes with a corresponding pinion on the shaft 13 driven by the measuring wheel.

The measuring wheel consists of two disks 14 and 15, loosely mounted on the shaft 13. On one of these disks, as 14, is pivoted a spring actuated pawl 16, arranged to engage the teeth of a ratchet wheel 17, keyed to the shaft 13, so that as the wheel is rotated by the onward movement of the cord as described, the shaft 13 will be rotated, thereby so rotating the cam 10 as to free the cutting blade into operative position. As soon as a certain length of cord has been drawn out, dependent upon the adjustment of the machine, as hereinafter described, the cam passes out of contact with the cutting blade, which is then actuated by the spring 9 to sever the cord. The cutting of the cord releases the brake, which is then shifted by the spring 4 so that the shoe 5 will bear against the measuring wheel and prevent any further movement thereof. Any backward movement of the cord is prevented by the detent 2.

By reference to Fig. 4, it will be observed that the cutting mechanism is so arranged with reference to the detent end of the brake lever, that, after the cord is cut, the end projecting beyond the detent will be sufficiently long to permit the operator to grasp it easily to pull out another length.

In one of the disks, as 14, of the measuring wheel, are formed a series of radial slots 18 and in the other disk 15 are formed a corresponding number of curved slots 19. As shown in Figs. 6 and 7, the inner and outer ends of the curved slots are an equal distance from the center of the disks, as the inner and outer ends of the straight slots. The pins 1 are inserted into these slots, as shown in Figs. 5, 6, 7 and 8, and are held in place as against longitudinal movement by washers 21 secured to the pins and fitting between the disks 14 and 15. The pins are adjusted in and out, as required, by rotating one of the disks while the other is held stationary, or by rotating the disks in opposite directions. The disks are held stationary with relation to each other in their adjusted positions by a thumb screw 22, passing through a curved slot 23 in one of the disks and screwing into the other disk. In order to prevent the disks being sprung or broken when drawn together by the thumb screw, a flange 24 of a depth approximately equal to the thickness of the washers 21 is formed on one of the disks, as shown in Fig. 8.

The number of revolutions of the wheel for each given length of cord cut off will, of course, be dependent upon the adjustment of the pins with relation to the center of rotation of the measuring wheels, and also the relative diameters of the bevel pinions on the shafts 11 and 13. In the machine illustrated, the shaft 13 will make four revolutions to one of the shaft 11. The relative rotations of the shafts 11 and 13 having been arranged, a considerable variation in the length of cord to be cut can be effected by an in or out adjustment of the pins, and by changing the relative rotations of the shafts 11 and 13, a further variation in the lengths of cord to be cut can be obtained.

Two, three or four seams are generally required to properly secure the broom straws in proper relation to each other in a broom, and on account of the taper in the broom body, different lengths of cord are required for the several seams. Hence, in order to provide for the cutting of the cords for each seam of a broom to the proper length, a series of measuring wheels corresponding to the number of seams to be formed by a sewing machine, is placed upon the shaft 13. Each of these measuring wheels is constructed in the manner hereinbefore described, the only difference between the several wheels being in the adjustment of the pins 1. As the disks 14 and 15 of each wheel are loosely mounted on the shaft 13 and are held from rotation by their brake except when the brake is shifted by a pull on the cord, it is evident that the cord may be drawn from any one of the wheels, without affecting any of the other wheels, beyond the mere rotation of the ratchet wheels 17 in such direction as not to affect the measuring wheels. A series of slots 6, corresponding to the number of measuring wheels, is formed in the plates 7 of the cutting mechanism and a like number of blades 8 is formed on a bar 25, which is operated on by the cam 10 and spring 9 in the manner hereinbefore described. As shown in Fig. 2, the blades 8 and the spring 9 are so arranged and connected that the blades are normally held just back of one of the walls of the slots, so that the cord will not be cut or frayed as it is drawn through the slots. By the action of the cam 10 the blades are pressed farther back from the slots, thereby placing the spring 9 under considerable tension, so that when the cam 10 passes away from the bar 25, the latter will be shot forward by the spring carrying the blades, across the slots. On the return of the spring to rest the blades will be back of the slots, as stated.

In order to hold the cords in line vertically with the blades, bent fingers 26 are so pivoted alongside the slots 6 that one portion thereof will project across the slots, while the portion on the opposite side of the pivotal point is weighted so as to retain the finger in normal position, as shown in Figs. 1 and 2. As the cord is pulled down to enter the slot, the horizontal portion of the finger will be pushed to one side, but will immediately return to normal position above the cord, as shown, and as the finger cannot be moved by any upward movement of the cord, the cord will be held within the plane of operation of the blade.

By reference to Fig. 1, it will be seen that the detent 2 is so arranged in relation to the cutting mechanism that when depressed by drawing the cord from the measuring wheel, the detent will move down into close proximity to the cutting mechanism and in line with one of the slots therein. It results from this arrangement of the detent that when the cord is drawn down by the operator, it is immaterial whether the operator draws directly in line with the slot in the cutting mechanism or not, the detent will insure the entering of the cord into the slot.

I claim herein as my invention—

1. In a machine for cutting cord, and other like material, the combination of a series of two or more measuring wheels, each independently rotated by the movement of the cord, and a cutting mechanism actuated by each of the measuring wheels, substantially as set forth.

2. In a machine for cutting cord, and other like material, the combination of a measuring wheel rotated by the movement of the cord, a cutting mechanism actuated by the measuring wheel, and a brake arranged to be shifted out of contact with the measuring wheel by the cord when being drawn from the measuring wheel, substantially as set forth.

3. In a machine for cutting cord, the combination of a measuring wheel, a cutting mechanism operative on a predetermined movement of the measuring wheel and constructed to permit of the insertion of the cord as it is being drawn from the wheel, and a movable detent arranged between the cutting mechanism and the measuring wheel and adapted to direct the cord into the cutting mechanism, substantially as set forth.

4. In a machine for cutting cord, the combination of a series of two or more measuring wheels rotated by the movement of the cords wound thereon, each wheel being provided with adjustable bearing portions for the cord, and a cutting mechanism operative on a predetermined movement of each of the measuring wheels, substantially as set forth.

5. In a machine for cutting cord, and other like material, the combination of a measuring wheel rotated by the movement of the cord, a cutting mechanism operative on a certain predetermined movement of the measuring wheel and a detent arranged between the measuring wheel and the cutting mechanism a short distance from the latter adapted to prevent backward movement of the cord, whereby a portion of the cord will project beyond the detent to be grasped for drawing out another length of cord, substantially as set forth.

6. In a machine for cutting cord, and other like material, the combination of a series of two or more measuring wheels loosely mounted on a shaft and adapted to be rotated by the cord, a series of two or more ratchet wheels secured to the shaft, a like series of pawls pivoted to the measuring wheels and adapted to engage the ratchet wheels and a cutting mechanism operated by the shaft, substantially as set forth.

7. In a machine for cutting cord, and other like material, the combination of a measuring wheel, a brake lever adapted to bear at one end upon the measuring wheel, a detent arranged on the opposite end of the brake lever, and a cutting mechanism, the operation of the several parts being controlled by the cord to be cut, substantially as set forth.

8. In a machine for cutting cord and other like material, the combination of a measuring wheel rotated by the movement of the cord, a cutting mechanism actuated by the measuring wheel, and a brake adapted to be operative on a predetermined movement of the measuring wheel, substantially as set forth.

In testimony whereof I have hereunto set my hand.

GEORGE F. McCOMBS.

Witnesses:
DARWIN S. WOLCOTT,
JOHN L. RALPH.